US009867090B2

(12) United States Patent
Hallenstål et al.

(10) Patent No.: US 9,867,090 B2
(45) Date of Patent: Jan. 9, 2018

(54) ACCESS TRANSFER FOR A DRVCC MOBILE TERMINAL (71) Applicant: TELEFONAKTIEBOLAGET L M ERICSSON (PUBL), Stockholm (SE)

(72) Inventors: Magnus Hallenstål, Täby (SE); Jan Holm, Gävle (SE); Fredrik Lindholm, Stockholm (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 507 days.

(21) Appl. No.: 13/885,483

(22) PCT Filed: Apr. 12, 2013

(86) PCT No.: PCT/EP2013/057705
§ 371 (c)(1),
(2) Date: May 15, 2013

(87) PCT Pub. No.: WO2013/171011
PCT Pub. Date: Nov. 21, 2013

(65) Prior Publication Data
US 2014/0133455 A1    May 15, 2014

Related U.S. Application Data (60) Provisional application No. 61/646,966, filed on May 15, 2012.

(51) Int. Cl.
H04W 4/00        (2009.01)
H04W 36/00       (2009.01)
H04L 29/06       (2006.01)

(52) U.S. Cl.
CPC ..... H04W 36/0022 (2013.01); H04L 65/1006 (2013.01); H04L 65/1016 (2013.01); H04L 65/1053 (2013.01); H04L 65/1069 (2013.01)

(58) Field of Classification Search
None
See application file for complete search history.

(56) References Cited

U.S. PATENT DOCUMENTS

2006/0135157 A1*  6/2006  Baek .................. H04W 8/02
                                                      455/433
2007/0058789 A1*  3/2007  Lim ................... H04W 76/025
                                                      379/88.17

(Continued)

FOREIGN PATENT DOCUMENTS

CN           101883443 A        11/2010

OTHER PUBLICATIONS

International Preliminary Report on Patentability for PCT Application No. PCT/EP2013/057705, dated May 15, 2014; 14 pages.

(Continued)

Primary Examiner — Edan Orgad
Assistant Examiner — Rebecca Song
(74) Attorney, Agent, or Firm — Sage Patent Group (57) ABSTRACT Dual Radio Access Transfer of an IMS in an alerting phase for the Packet Switched to Circuit Switched direction includes initiating an IMS media session towards UE and, during a session alerting phase, making a determination that a DRVCC transfer is required from a PS to CS, access, sending a SIP message from the UE to a SCC-AS, over the PS access, informing the SCC-AS of the DRVCC transfer, and responding to receipt of the SIP message at the SCC-AS by sending a SIP INVITE from the SCC-AS towards MSC. The SIP INVITE includes an identity of the UE as a called party identity and the STN as the calling party identity. The Transfer includes sending from the MSC to the UE a CS Setup message, whereupon the MSC is placed in a state in which it expects a CS Answer from the UE.

14 Claims, 7 Drawing Sheets

(56) References Cited

U.S. PATENT DOCUMENTS

| | | | |
|---|---|---|---|
| 2008/0165764 A1 | 7/2008 | Mutikainen et al. | |
| 2010/0070632 A1* | 3/2010 | Song | H04W 76/026 709/227 |
| 2010/0103927 A1* | 4/2010 | Bakker | H04M 3/428 370/352 |
| 2010/0303012 A1* | 12/2010 | Atarius | H04L 65/1069 370/328 |
| 2011/0026518 A1* | 2/2011 | Jin et al. | 370/352 |
| 2011/0051722 A1* | 3/2011 | Jin | 370/357 |
| 2011/0090848 A1* | 4/2011 | Kim et al. | 370/328 |
| 2012/0044838 A1* | 2/2012 | Yi | H04W 36/0022 370/260 |
| 2012/0220300 A1* | 8/2012 | Zou | H04W 36/0011 455/436 |

OTHER PUBLICATIONS

Ericsson et al.: "Alerting for DRVCC", Change Request; 3GPP Draft; 23.237, version 11.4.0; vol. SA WG2 Meeting #91, Kyoto, Japan; May 15, 2012; S2-122138; XP050632653; 5 pages.

International Search Report, PCT Application No. PCT/EP2013/057705 dated Nov. 21, 2013, 4 pages.

Written Opinion of the International Searching Authority, PCT Application No. PCT/EP2013/057705 dated Nov. 21, 2013, 11 pages.

3GPP TR 23.806 V7.0.0 (Dec. 2005); 3GPP SA WG2; $3^{rd}$ Generation Partnership Project; Technical Specification Group Services and System Aspects; "Voice Call Continuity between CS and IMS Study" (Release 7); 650 Route Des Luciole; F-06921 Sophia-Antipolis Cedex; France, Dec. 1, 2005, XP002385067, 153 pages.

Ericsson et al., Change Request—"Alerting for DRVCC", SA WG2 Meeting #91, Kyoto, Japan, May 21-25, 2012, 5 pp.

3GPP, Technical Specification—"$3^{rd}$ Generation Partnership Project; Technical Specification Group Core Network and Terminals; Mobile radio Interface Layer 3 specification; Core network protocols; Stage 3 (Release 10)", TS 24.008, V10.6.0, Mar. 2012, 648 pp.

3GPP, Technical Specification—"$3^{rd}$ Generation Partnership Project; Technical Specification Group Services and System Aspects; IP Multimedia Subsystem (IMS) centralized services; Stage 2 (Release 11)", TS 23.292, V11.2.0, Mar. 2012, 118 pp.

3GPP, Technical Specification—"$3^{rd}$ Generation Partnership Project; Technical Specification Group Services and System Aspects; IP Multimedia Subsystem (IMS) Service Continuity; Stage 2 (Release 11)", TS 23.237, V11.4.0, Mar. 2012, 162 pp.

European Extended Search Report Corresponding to European Application No. 15 187 601.8; dated Jan. 4, 2016; 4 Pages.

First Office Action with English language machine translation, Chinese Patent Application No. 201380025379.5, dated Nov. 23, 2016.

* cited by examiner

ACCESS TRANSFER FOR A DRVCC MOBILE TERMINAL

CROSS REFERENCE TO RELATED APPLICATIONS

This application is a 35 U.S.C. §371 national stage application of PCT International Application No. PCT/EP2013/057705, filed on 12 Apr. 2013, which itself claims the benefit of U.S. provisional Patent Application No. 61/646,966, filed 15 May 2012, the disclosures and contents of both of which are incorporated by reference herein in their entirety.

TECHNICAL FIELD

The present invention relates to the Packet Switched to Circuit Switched transfer of a voice or video call involving a Dual Radio Voice Call Continuity mobile terminal. More particularly, the invention concerns the handover of a Dual Radio Voice Call Continuity mobile terminal on the terminating call side during a call alerting phase.

BACKGROUND

IP Multimedia Subsystem (IMS) is a standardised and established architecture for delivering IP multimedia services to end users. IMS is to a large extent agnostic concerning the access network used by the end users: access networks may be wireless or fixed line. In the context of IMS, it is important to allow end users to seamlessly move between access networks and access technologies, e.g. to allow voice and video call continuity during such movements.

Figure 1:
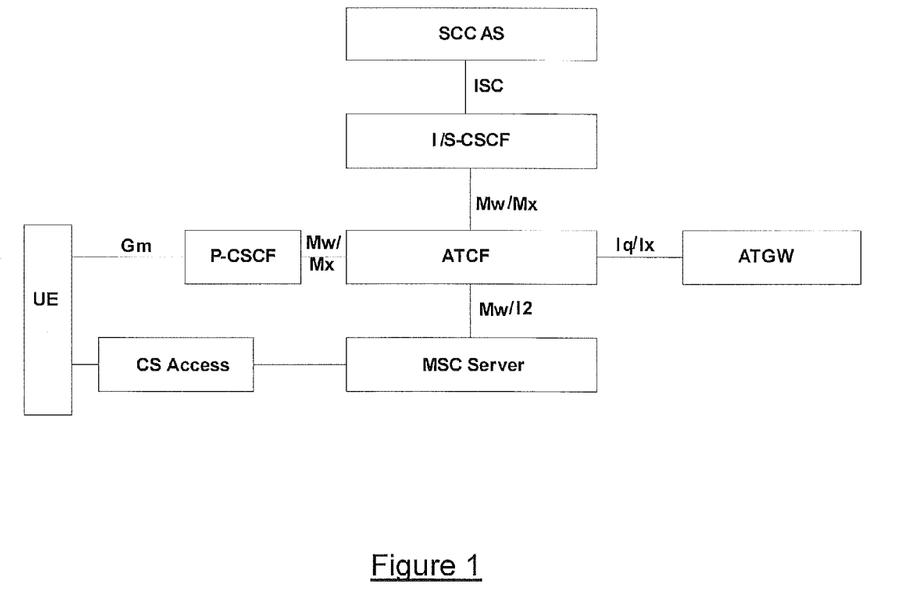
FIG. 1 illustrates schematically the reference architecture for SRVCC (also applicable to DRVCC)

3GPP TS 23.237 v11.4.0 specifies Single Radio Voice Call Continuity (SRVCC) as a functionality defined for the Long Term Evolution (LTE) architecture to allow voice and video calls to be transferred or "handed over" from the LTE packet switched (PS) domain to a legacy circuit switched (CS) domain, in the case where a mobile terminal has only a single radio interface available to it. Such a transfer might be required, for example, when a call is established by a user terminal over a packet switched (PS) LTE connection and it becomes necessary, due to a deterioration in the LTE radio quality, to transfer the call to a 3G UMTS circuit switched (CS) connection. FIG. 1 illustrates schematically the reference architecture for SRVCC (using the Access Transfer Control Function, ATCF, enhancements).

SRVCC relies upon a network (LTE) determination that a PS to CS handover for a given UE is required. The UE is instructed to perform the handover by way of a (SIP) message sent to it over the PS access (i.e. over the Gm interface), and as a result disconnects from the PS access and connects instead to the CS access. A serving MSC within the CS network is caused to send a setup signal to the UE over the now established CS access in order to establish a CS voice call between the UE and the MSC, whereupon the call is transferred to the CS access. A special case arises when handover is required at the call terminating side during the call alerting phase, i.e. after an INVITE has been received by the UE but prior to the user answering the call. This special case is considered in 3GPP TS 23.237 v11.4.0 section 6.3.2.1.4c.

3GPP TS 23.237 also specifies Dual Radio VCC (DRVCC) as a mechanism analogous to SRVCC but concerned with mobile terminals that have dual radio interfaces, i.e. radio interfaces that can be used in parallel. As with SRVCC, DRVCC makes provision for handover of a voice or video call from a PS to a CS access following call establishment. [In contrast to SRVCC, a determination to perform such a handover in the case of DRVCC is made by the UE rather than within the network.] However, the DRVCC specifications have not previously provided a means to handle a PS to CS handover during a voice or video call alerting phase and in particular have not addresses the call terminating side case.

Figure 2:
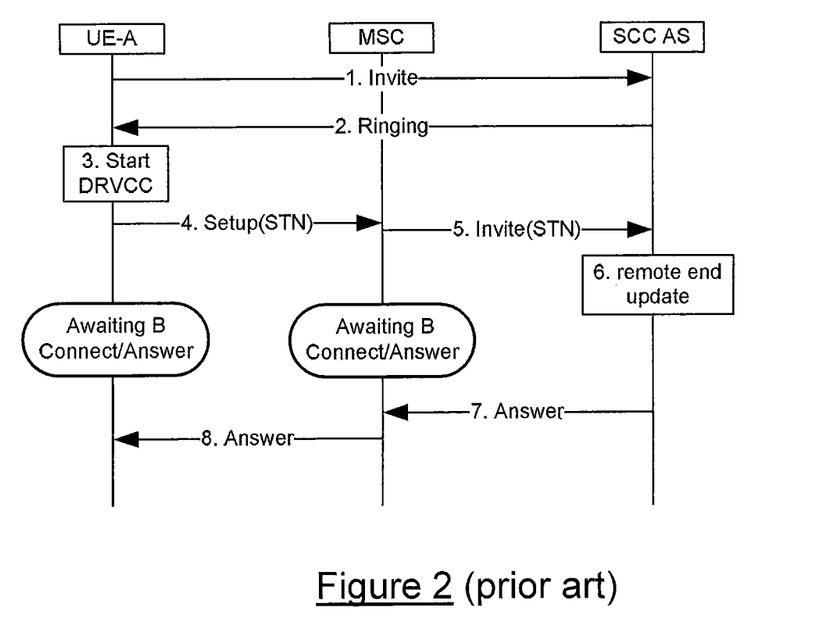
FIG. 2 illustrates a flow associated with a successful DRVCC transfer from PS to CS for an IMS session in alerting phase, where the UE being transferred is on an originating side.

In the context of DRVCC, FIG. 2 illustrates a possible mechanism for handling PS to CS handover of a voice or video call at the call originating side, during the alerting state. An originating user UE-A sends an INVITE towards a terminating user (not shown) and receives a Ringing response: this exchange uses the PS access. At this point, UE-A determines that the quality of the PS access is not suitable for the call, and a DRVCC process is initiated by UE-A in order to transfer to a CS access. UE-A sends a setup request, via the CS access, to the MSC on the originating side. The request includes a Session Transfer Number (STN), a number statically configured on the UE which is used to route the transfer to the SCC AS. The MSC in turn sends an INVITE to the SCC AS (serving UE-A), with the STN being included within the INVITE. [NB. FIG. 2 assumes that the MSC comprises some interworking function able to provide interworking between the IMS side and the CS signalling side.] The SCC-AS uses the STN contained within the INVITE to detect that the request is a request to transfer the session from PS access to CS access, and uses additional information in the signalling (such as the calling party number) to correlate the transfer request with the INVITE previously sent over the PS access. As a result of sending the INVITE, the MSC knows to expect an Answer. When the Answer is received from the SCC AS, the MSC sends an Answer to UE-A and call set up over the CS access proceeds as usual.

Figure 3:
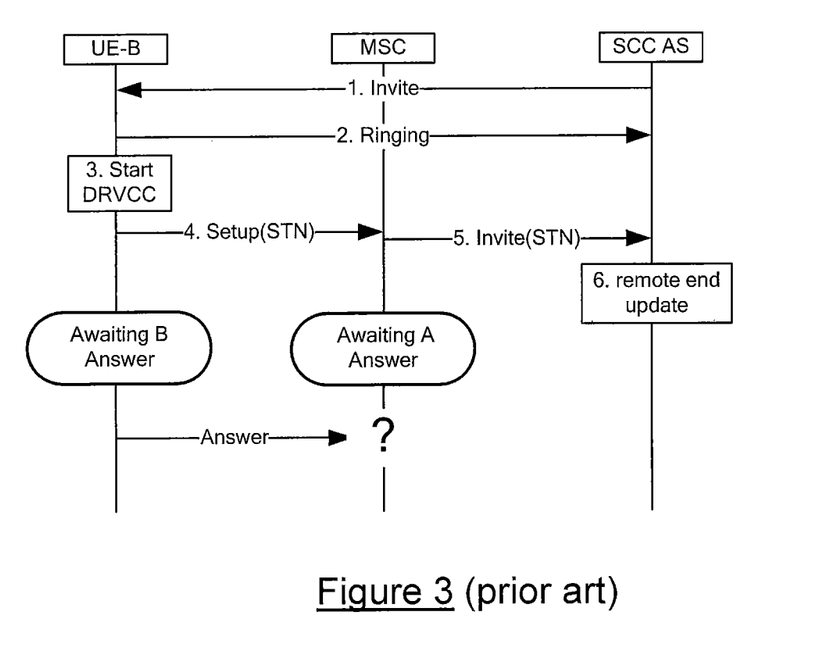
FIG. 3 illustrates a flow associated with an unsuccessful DRVCC transfer from PS to CS for an IMS session in alerting phase, where the UE being transferred is on an terminating side.

FIG. 3 illustrates a problem that might arise when handling DRVCC on the terminating side during a call alerting phase. In this case, the called party, UE-B, which is initially connected to a PS access, receives an INVITE from UE-A, and sends a Ringing response. At this point, UE-B determines that the quality of the PS access is not suitable for the voice call, and a DRVCC process is initiated by UE-B in order to transfer to a CS access. UE-B then sends a Setup message (standard CS signalling) to the MSC to initiate the transfer. The MSC reacts to the Setup message by sending an INVITE towards the SCC AS. [NB. The MSC may alternatively use CS trunk signalling, e.g. ISUP, in which case the trunk signalling setup message will be routed via a Media Gateway Controller]. At this point, the MSC is awaiting an Answer from the remote end, i.e. from the SCC-AS. In the event that a user answers at UE-B, causing an Answer to be sent to the MSC, this unexpected answer causes an error case to arise at the MSC due to un-matched states existing at UE-B and the MSC.

Whilst it would be possible to solve this problem by introducing new logic into the MSC, this is in practice difficult to achieve due to the large number of already deployed MSCs. A preferred solution is one that involves modifications at only the mobile terminals and the SCC-AS. On the one hand, it is relatively easy to upgrade and deploy terminal software whilst on the other relatively few SCC-ASs have been deployed and it will be a relatively easy task to update those ASs.

SUMMARY

It is an object of the present invention to overcome or at least mitigate the problems discussed above. This may be achieved by allowing a terminating mobile terminal to notify a SCC-AS that a PS to CS transfer in alerting phase is required. The SCC-AS may then ensure that the MSC is placed in the correct state to receive an answer from the mobile terminal.

According to a first aspect of the present invention there is provided a method of Dual Radio Access Transfer of an IP Multimedia session, IMS, in an alerting phase for the Packet Switched to Circuit Switched direction. The method comprises initiating an IMS media session towards a terminating mobile station, UE and, during a session alerting phase, making a determination at the UE that a DRVCC transfer is required from a Packet Switched, PS, to a Circuit Switched, CS, access. The method comprises sending a SIP message from the UE to a Service Centralization and Continuity Application Server, SCC-AS, over the PS access, informing the SCC-AS of the DRVCC transfer, and responding to receipt of the SIP message at the SCC-AS by sending a SIP INVITE from the SCC-AS towards a Mobile Switching Centre, MSC, serving the UE in the CS access, the INVITE including an identity of the UE as a called party identity and the STN as the calling party identity. The method further comprises responding to receipt of said INVITE at the MSC, or to receipt of associated CS signalling, by sending from the MSC to the UE a CS Setup message, whereupon the MSC is placed in a state in which it expects a CS Answer from the UE.

The SIP INVITE may be received by a Media Gateway Control Function, MGCF, with the MGCF translating the INVITE into associated CS signalling, and sending that associated CS signalling to the MSC.

According to a second aspect of the present invention there is provided Dual Radio Access mobile terminal, UE. The terminal comprises a Dual Radio Voice Call Continuity, DRVCC, module for determining that a DRVCC transfer is required, from a Packet Switched, PS, to a Circuit Switched, CS, access, in respect of an IMS session in alerting phase and for which the UE is a terminating UE, and a session transfer initiator, responsive to a determination that such a DRVCC transfer is required, for sending a SIP message to a Service Centralization and Continuity Application Server, SCC-AS, over a PS access, informing the SCC-AS of the DRVCC transfer.

The mobile terminal may comprise a CS session establishment module for receiving a CS Setup message from the CS access, identifying an STN contained within the CS Setup message and correlating the CS Setup message with said IMS session using the STN, and for returning a CS connect to the CS access indicating that the CS call has been answered, whereupon the mobile terminal is placed into an active state.

According to a third aspect of the present invention there is provided Service Centralization and Continuity Application Server. The server comprises a SIP message handler for receiving over a PS access from a mobile terminal, UE, a SIP message informing the SCC-AS that a DRVCC transfer from a Packet Switched, PS, to a Circuit Switched, CS, access, in respect of an IMS session in alerting phase is required, and a session transfer controller responsive to receipt of said SIP message to send a SIP INVITE from the SCC-AS towards a Mobile Switching Centre, MSC, serving the UE in the CS access, the INVITE including an identity of the UE as a called party identity and an STN as the calling party identity.

DETAILED DESCRIPTION

A procedure is proposed here for handling the transfer of a call in an alerting state for DRVCC, assuming a PS to CS transfer on the terminating call side. The procedure comprises, upon a determination at a terminating UE that a DRVCC transfer is required, placing the MSC within the CS access into a state in which it expects an answer from the terminating UE. As such, when the MSC receives an answer from the UE, no error state arises at the MSC. The procedure is such that no changes are required at the MSC.

The terminating UE may send to the SCC AS a message indicating that a DRVCC transfer should be started, whereupon the SCC AS sends an INVITE towards the MSC (this may be converted to a CS trunk signalling message on its path towards the MSC). The MSC sends a setup request to the terminating UE. This process causes the MSC to be placed in the correct state.

A user terminal is proposed that is capable of sending an appropriate notification to the SCC AS to cause the SCC AS to place the MSC into the correct state.

An SCC AS is proposed that is able to receive a notification that a DRVCC transfer is necessary for a terminating UE in alerting state, and to start the DRVCC procedure by sending an INVITE towards that UE. This INVITE causes the MSC to be placed into a state in which it expects an answer from the terminating UE (the INVITE may be translated to a related CS trunk signalling message on its way to the MSC).

Figure 4:
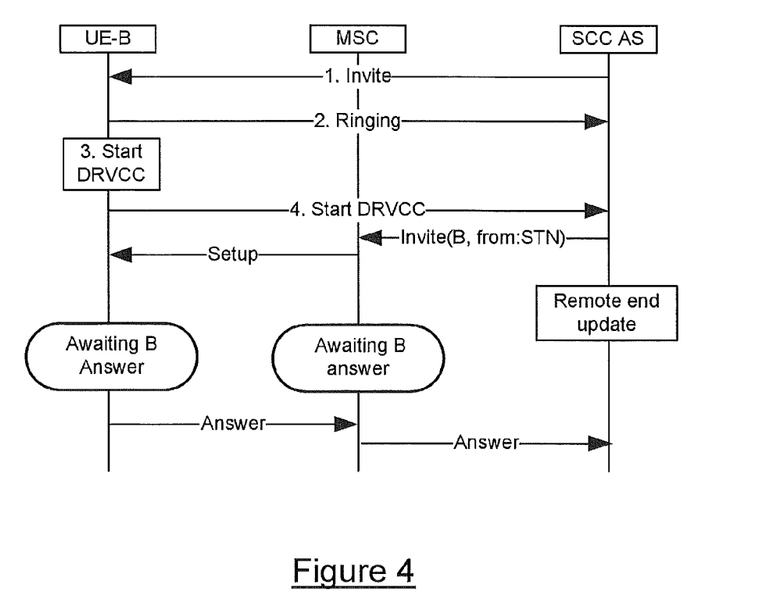
FIG. 4 illustrates a flow associated with a successful DRVCC transfer from PS to CS for an IMS session in alerting phase, where the UE being transferred is on an terminating side.

FIG. 4 illustrates a solution to the problem identified above and illustrated in FIG. 3, in line with this approach. Instead of step 4 in FIG. 2, the UE sends a SIP message—Start DRVCC—to the SCC AS over the Gm interface indicating that a DRVCC PS to CS transfer should start. The SCC AS will then start the session transfer procedure. This solution does not require any changes to be made to the MSC.

Figure 5:
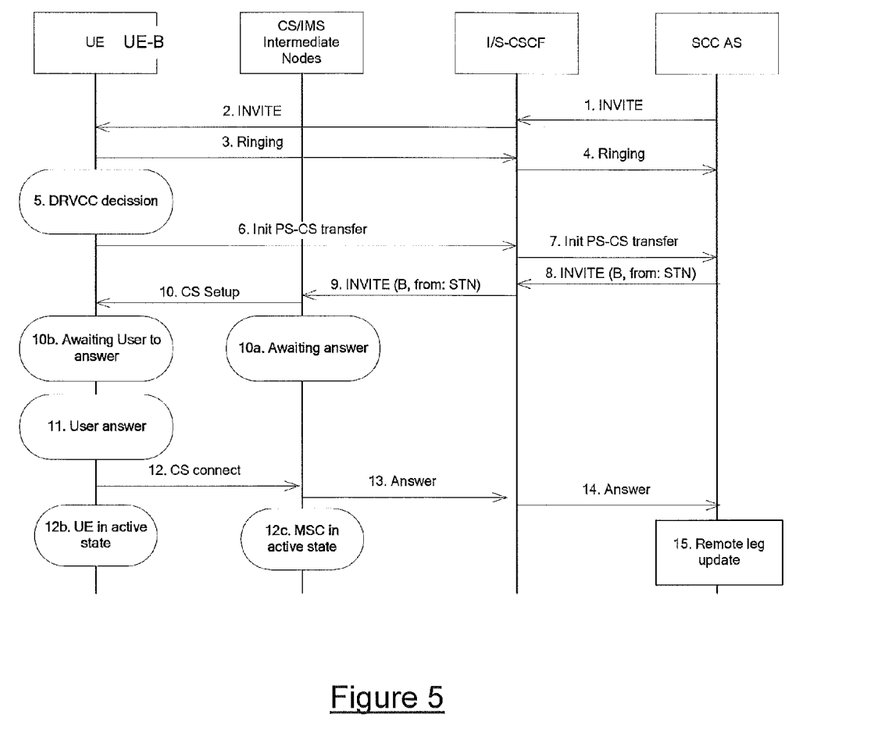
FIG. 5 illustrates the flow of FIG. 4 in more detail.

Referring now to FIG. 5, this shows in more detail an information flow for Dual Radio Access Transfer of media of an IMS session in alerting state for the PS to CS direction. The flow requires (a) that the user is active in a terminating IMS session and that the SIP session is in alerting state, and (b) that there is no other ongoing session and the UE has not yet responded over the access leg. With reference to FIG. 5, the following steps can be identified:

1-4. Standard procedures are used to initiate a SIP session towards the terminating UE-B. UE-B alerts the user to the incoming voice or video-call session.

5. UE-B determines a need for Access Transfer to CS. If the user is not attached to the CS domain at this time, UE-B performs a CS Attach as specified in TS 23.292, clause 7.2.1.

6. In the ongoing SIP session, UE-B sends a SIP message—Init PS-CS transfer—towards SCC AS which includes a request to initiate session transfer from PS to CS. This SIP message might be, for example, a SIP INFO or SIP REFER in which case the message includes the STN in order to allow it to be routed to the (correct) SCC-AS. The message may alternatively be a SIP 488 in which case the message will automatically be routed back to the SCC-AS via the path followed by the INVITE and it is not necessary for the STN to be included.

7. Standard procedures are used at the I/S-CSCF to route the SIP message to the SCC AS.

8. The SCC AS starts the Session transfer procedure by sending a SIP INVITE towards UE-B via the CS access, i.e. with user B's identity as called party identity to which it is addressable over the CS access (i.e., the MSISDN). The SCC AS uses the STN as the calling party ID so that the UE-B can correlate the INVITE with the ongoing session. [Note that in some cases it will not be possible to route the call directly to UE-B using UE-B's MSISDN, in which case so-called CS breakout procedures may be used to route the call to UE-B via the MSC in the CS access. This could be achieved, for example, using so-called pre-fix routing or using a CSRN (see e.g., 23.292 Annex F.3).]

NOTE: The SCC AS can direct the session to the CS access over Mg or I2, see TS 23.292.

9. Standard procedures are used at the I/S-CSCF to route the INVITE to the MSC Server. If the MSC Server is not enhanced, CS signalling will be used via an MGCF (possibly an IAM message sent between the MGCF and MSC, which is then translated to a CS SETUP by the MSC and sent towards the UE).

10. The MSC server sends a CS Setup to UE-B. UE-B determines that Access Transfer using DRVCC is requested when the calling party received is its own STN 10a. At sending of the CS Setup the MSC puts itself in a state ready to receive an answer from UE-B. This is standard MSC behaviour.

10b. At receipt of the CS Setup, UE-B puts itself in a state ready to receive an answer by the user.

11. The user answers.

12. UE-B uses the standard procedure to send the CS connect message to the MSC Server as described, for example, in TS 24.008.

12a. UE-B moves to an active state.

12b. The MSC Server moves to an active state.

13. The MSC sends an answer message in the SIP session started in 8.

14. Standard procedures are used at the I/S-CSCF to route the answer to the SCC AS.

15. The SCC AS creates the corresponding SIP request to the remote end and updates the remote leg.

In the procedure described above, new functionality is introduced into the UE and the SCC-AS in order to implement steps 6 and 8. In particular, new functionality is introduced into the UE in order to cause the UE to send the SIP message, identifying the transfer, towards the SCC-AS. New functionality is introduced into the SCC-AS in order to cause the SCC-AS to react to receipt of this SIP message by sending the SIP INVITE towards the UE (and the MSC). Other steps are achieved using already standardised functionality. Indeed, a significant advantage of the procedure is that no modifications are required to the MSC or to any other intermediate nodes.

Figure 6:
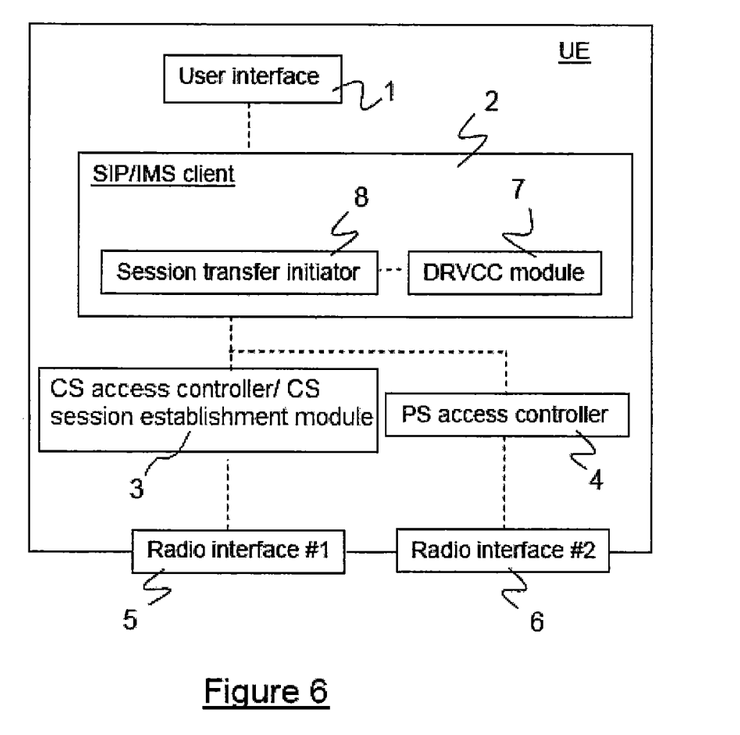
FIG. 6 illustrates schematically a UE architecture for implementing the flow of FIGS. 4 and 5.

Considering the UE, FIG. 6 illustrates schematically certain components of a DRVCC mobile terminal, UE, enhanced in order to handle DRVCC PS to CS transfer during an IMS session alerting phase. It will be appreciated that the UE will comprise certain standard functionality implemented using various software and hardware components including a processor, memory, etc. The UE comprises a user interface 1 comprising, for example, a display, keypad, speaker, microphone etc. The user interface allows a user to interact with the UE. In particular, the interface allows the user to be alerted to an incoming voice or video call and to answer such a call. The UE also comprises a SIP/IMS client 2 that is responsible for establishing and controlling IMS sessions including voice and video calls.

A CS access controller/CS session establishment module 3 is responsible for performing CS attach and detach in dependence upon control signals provided to it by the SIP/IMS client 2. The CS access controller/CS session establishment module also relays control signalling between the CS access and the SIP/IMS client. A PS access controller 4 is similarly responsible for performing PS attach and detach, and for relaying control signalling between the PC access and the SIP/IMS client. The CS access controller/CS session establishment module 3 and PS access controller 4 communicate with the CS and PS access network via respective radio interfaces 5,6.

Considering further the SIP/IMS client 2, as well as certain know standard functions, this implements a DRVCC module 7 adapted to determine that a DRVCC transfer is required, from a Packet Switched, PS, to a Circuit Switched, CS, access, in respect of an IMS session in alerting phase. The client 2 further comprises a session transfer initiator 8 coupled to the DRVCC module 7. When the DRVCC module makes a determination that an IMS session in alerting phase is to be transferred from the PS to the CS access, it indicates this to the session transfer initiator 8. The session transfer initiator 8 responds by sending a SIP message to a Service Centralization and Continuity Application Server, SCC-AS, over a PS access, i.e. via the PS access controller 4 and associated radio interface 6, informing the SCC-AS of the DRVCC transfer and optionally including a Session Transfer Number, STN, of the UE.

Figure 7:
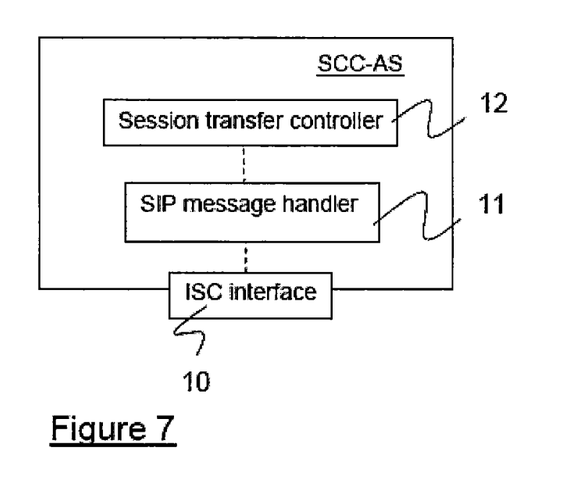
FIG. 7 illustrates schematically an SCC-AS architecture for implementing the flow of FIGS. 4 and 5.

Considering now the SCC-AS, this is illustrated schematically in FIG. 7. The SCC-AS includes an ISC interface 10 that allows the SCC-AS to send and receive SIP messages, e.g. with an I-CSCF or S-CSCF, relating to IMS subscriber sessions. It further comprises a SIP message handler 11 for receiving, via the PS access, from a mobile terminal, UE, a SIP message informing the SCC-AS that a DRVCC transfer from a Packet Switched, PS, to a Circuit Switched, CS, access, in respect of an IMS session in alerting phase is required. As already noted above, this SIP message optionally includes a Session Transfer Number, STN, of the UE. The SCC-AS comprises a session transfer controller 12, coupled to the SIP message handler 11 and responsive to receipt of said SIP message to send a SIP INVITE from the SCC-AS towards a Mobile Switching Centre, MSC, serving the UE in the CS access. The session transfer controller 12 is configured to include in the INVITE an identity of the UE as a called party identity and the STN as the calling party identity.

Figure 8:
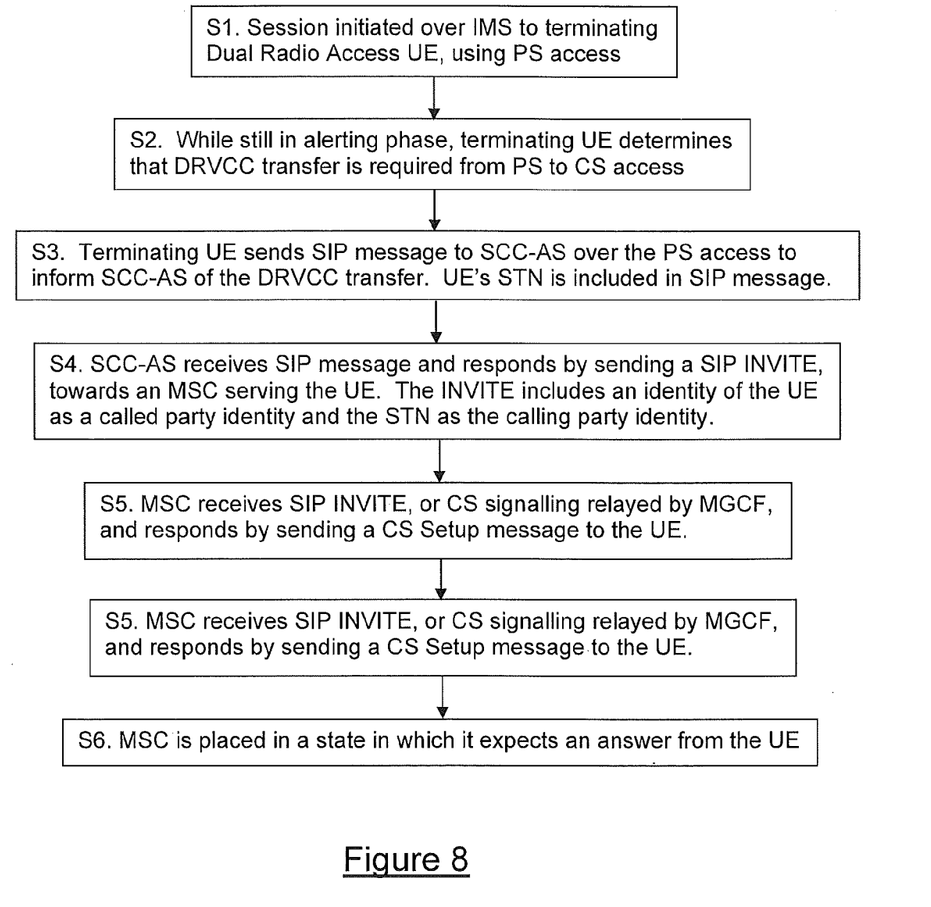
FIG. 8 is a flow diagram illustrating a general procedure for handling DRVCC transfer of a session from PS to CS in an alerting phase.

FIG. 8 is a flow diagram illustrating in general terms the transfer procedure described above. At step S1, an IMS media session is initiated towards a terminating mobile station, UE. Then, at step S2, during a session alerting phase, a determination is made at the UE that a DRVCC transfer is required from a Packet Switched, PS, to a Circuit Switched, CS, access. At step S3, the terminating UE sends a SIP message to a Service Centralization and Continuity Application Server, SCC-AS, over the PS access, informing the SCC-AS of the DRVCC transfer and optionally including a Session Transfer Number, STN, of the UE.

At step S4, the SCC-AS receives the SIP message and responds by sending a SIP INVITE from the SCC-AS towards a Mobile Switching Centre, MSC, serving the UE in the CS access, the INVITE including an identity of the UE as a called party identity and the STN as the calling party identity. At step S5, the MSC receives the INVITE, or CS signalling relayed by the MGCF, and responds by sending to the UE a CS Setup message. At step S6 the MSC is placed in a state in which it expects a CS Answer from the UE.

Figure 9:
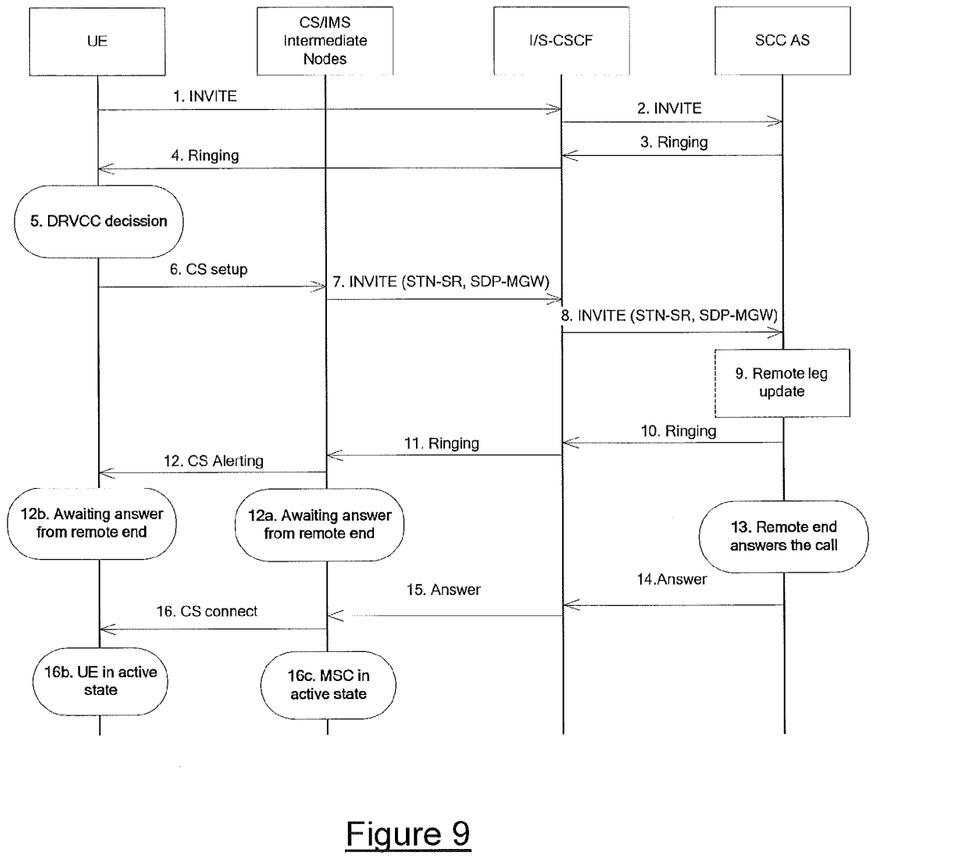
FIG. 9 illustrates a flow associated with a successful DRVCC transfer from PS to CS for an IMS session in alerting phase, where the UE being transferred is on an originating side.

Of primary interest here is the case of DRVCC arising at the terminating side (FIGS. 3 and 4). However, it may be helpful to consider also DRVCC at the originating side. FIG. 9 illustrates an example information flow for the DRVCC transfer from PS to CS, considering the originating side case (outgoing voice or video call, IMS session, in alerting phase). The flow requires that the user is active in a terminating IMS session and that the SIP session is in alerting state, there is no other ongoing session and the UE has not responded over the access leg. FIG. 9 illustrates in particular the following steps:

1-4. Standard procedures are used to initiate a SIP session on behalf of UE-A. UE-A is alerting the user for the incoming voice or video-call session.
5. UE-A determines a need for Access Transfer from PS to CS. If the user is not attached to the CS access at this point in time, UE-A performs a CS Attach as specified in TS 23.292, clause 7.2.1.
6. UE-A starts the Dual Radio Access Transfer procedure by sending a CS setup message destined to STN according to TS 24.008.
7. MSC Server routes the call towards the STN received in 6. If the MSC is not enhanced, SC signalling will be used and the call setup message will be routed through an MGCF.
8. Standard procedures are used at I/S-CSCF for routing of the INVITE to the SCC AS.
9. The SCC AS uses the STN to determine that Access Transfer using Dual Radio VCC is requested. The SCC AS may retrieve the C-MSISDN from the HSS. The SCC AS identifies the correct anchored session. The SCC AS proceeds with the Access Transfer of the recently added active session with bi-directional speech or bi-directional speech and synchronised video for the UE-A by updating the Remote Leg with the media description and other information using the Remote Leg Update procedure as specified in clause 6.3.1.5 (with reference to the current 3GPP proposal).
NOTE 1: It is assumed the initial SDP negotiation has been completed prior to triggering the (v)SRVCC, thus the SCC AS can update the remote leg.
10. The SCC AS sends a Ringing message towards UE-A
11. The S-CSCF forwards the Ringing message to the MSC Server.
12. The MSC server sends a CS Alerting message to UE-A according to TS 24.008 [24].
12a. The MSC moves to alerting state, see TS 24.008.
12b. UE-A moves to alerting state and ensures that the same ring back tone is played to the end user.
13. The remote end answers the call.
14. The SCC AS sends an Answer message towards the MSC.
15. Standard procedures are used at S-CSCF for routing the Answer message to the MSC.
16. The MSC uses the standard procedure to send the CS connect message to UE-A as described in TS 24.008.
16a. The MSC moves to Active state.
16b. UE-A moves to Active state.

Considering now the case of a CS to PS Access Transfer: CS to PS—Dual Radio, incoming voice call in alerting phase, this procedure is handled according to the existing "PS-PS Access Transfer with full media transfer for an incoming call in early dialog phase" (6.3.2.2.3) with the following amendment for step 1-4. An MSC server has started a CS session towards the UE which is centralized in IMS according to in TS 23.292. The UE is awaiting answer from the User. Before the user answers, the UE decides to move to PS. The procedure follows as from step 5 in 6.3.2.2.3. IP-CAN 2 represents the new PS leg. The UE uses the statically configured STI for the transfer.

Considering now the case of CS to PS Access Transfer: CS to PS—Dual Radio, outgoing voice call in alerting phase, this procedure is handled according to the procedure in 6.3.2.2.4 "PS-PS Access Transfer with full media transfer for an outgoing call in early dialog phase" with the following amendment for step 1-4. The UE has started a CS session that is centralized in IMS according to in TS 23.292. The UE is awaiting answer from the remote end. Before the remote end answers, the UE decides to move to PS. The procedure follows as from step 5 in 6.3.2.2.3. IP-CAN 2 represents the new PS leg. The UE uses the statically configured STI for the transfer.

It will be appreciated by the person of skill in the art that various modifications may be made to the above described embodiments without departing from the scope of the invention.

The invention claimed is:

1. A method of Dual Radio Access Transfer of an IP Multimedia session, IMS, in an alerting phase for a Packet Switched PS, to Circuit Switched, CS, direction, the method comprising:
    initiating an IMS media session towards a terminating mobile station, UE;
    receiving a ringing response from the UE using a PS access;
    while the IMS media session is in an alerting phase,
    receiving a SIP message from the UE at a Service Centralization and Continuity Application Server, SCC-AS, over the PS access, informing the SCC-AS that a Dual Radio Voice Call Continuity, DRVCC, transfer is requested from PS access to CS access;
    responding to receipt of the SIP message at the SCC-AS by sending a SIP INVITE from the SCC-AS towards a Mobile Switching Centre, MSC, serving the UE in the CS access, the SIP INVITE including an identity of the UE as a called party identity and the Session Transfer Number, STN, as the calling party identity; and responding to receipt of said SIP INVITE from the SCC-AS at the MSC, by sending from the MSC to the UE a CS Setup message without awaiting an intervening response from the UE, whereupon the MSC is placed in a state in which it expects a CS Answer from the UE, wherein the CS Setup message is sent from the MSC to the UE directly responsive to receipt of the SIP INVITE from the SCC-AS at the MSC.

2. The method according to claim 1, wherein said SIP INVITE is received by a Media Gateway Control Function, MGCF, the MGCF translating the SIP INVITE into associated CS signalling, and sending the associated CS signalling to the MSC.

3. The method according to claim 1, wherein the alerting phase occurs after an INVITE has been received by the UE but prior to a user answering a call.

4. The method according to claim 1, wherein the UE is active in a terminating IMS session.

5. The method according to claim 1, wherein the UE is not part of an ongoing IMS session prior to the initiating the IMS media session.

6. The method according to claim 1, wherein the UE has not responded over the PS access prior to the MSC sending the CS Setup message.

7. The method according to claim 1,
wherein the UE is active in a terminating IMS session,
wherein the UE is not part of an ongoing IMS session prior to the initiating the IMS media session, and
wherein the UE has not responded over the PS access prior to the MSC sending the CS Setup message.

8. A Dual Radio Access mobile terminal, UE, comprising:
a memory device including functional modules; and
a processor configured to execute computer program instructions from the functional modules, the functional modules comprising:
a Dual Radio Voice Call Continuity, DRVCC, module that is configured to determine that a DRVCC transfer is required after transmitting a ringing response to a session initiation request using a PS access and while an IP Multimedia Session, IMS, is in an alerting phase, from a Packet Switched, PS, to a Circuit Switched, CS, access, in respect of an IMS session in an alerting phase and for which the UE is a terminating UE; and
a session transfer initiator, responsive to a determination that such a DRVCC transfer is required, that is configured to send a SIP message to a Service Centralization and Continuity Application Server, SCC-AS, over a PS access, informing the SCC-AS of the DRVCC transfer, and to receive a CS Setup message that was sent by a Mobile Switching Centre (MSC) without awaiting an intervening communication from the MSC, responsive to receipt of a SIP INVITE from the SCC-AS,
wherein the CS Setup message is received by the UE from the MSC, directly responsive to receipt of the SIP INVITE from the SCC-AS at the MSC.

9. The mobile terminal according to claim 8, wherein said SIP message is one of a SIP INFO, SIP 488, or SIP Refer.

10. The mobile terminal according to claim 8, the functional modules further comprising:
a CS session establishment module that is configured to receive a CS Setup message from the CS access, to identify a session transfer number, STN, contained within the CS Setup message and to correlate the CS Setup message with said IMS session using the STN, and to return a CS connect to the CS access indicating that the CS call has been answered, whereupon the mobile terminal is placed into an active state.

11. The mobile terminal according to claim 8, wherein the alerting phase occurs after an INVITE has been received by the UE but prior to a user answering a call.

12. A Service Centralization and Continuity Application Server comprising:
a SIP message handler that is configured to receive over a PS access from a mobile terminal, UE, a SIP message informing the SCC-AS that a Dual Radio Voice Call Continuity, DRVCC, transfer from a Packet Switched, PS, to a Circuit Switched, CS, access, in respect of an IMS session in an alerting phase, and for which a ringing response has been received from the UE using a PS access, is required; and
a session transfer controller, responsive to receipt of said SIP message, that is configured to send a SIP INVITE from the SCC-AS towards a Mobile Switching Centre, MSC, which directly responsively sends, without awaiting an intervening response from the UE, a CS Setup message to the UE that the MSC serves in the CS access,
wherein the SIP INVITE comprises an identity of the UE as a called party identity and a Session Transfer Number, STN, as a calling party identity.

13. The Service Centralization and Continuity Application Server according to claim 12, wherein said SIP message is one of a SIP INFO, SIP 488, or SIP Refer.

14. The Service Centralization and Continuity Application Server according to claim 12, wherein the alerting phase occurs after an INVITE has been received by the UE but prior to a user answering a call.

* * * * *

UNITED STATES PATENT AND TRADEMARK OFFICE
CERTIFICATE OF CORRECTION

PATENT NO.         : 9,867,090 B2
APPLICATION NO.    : 13/885483
DATED              : January 9, 2018
INVENTOR(S)        : Hallenstal et al.

Page 1 of 1

It is certified that error appears in the above-identified patent and that said Letters Patent is hereby corrected as shown below:

In the Claims

In Column 8, Line 50, in Claim 1, delete "Switched" and insert -- Switched, --, therefor. (First Occurrence)

Signed and Sealed this
Twenty-fourth Day of July, 2018

Andrei Iancu
*Director of the United States Patent and Trademark Office*